US007995561B2

(12) United States Patent
Li et al.

(10) Patent No.: US 7,995,561 B2
(45) Date of Patent: Aug. 9, 2011

(54) TECHNIQUES FOR IMPLEMENTING LOGICAL TRUNK GROUPS WITH SESSION INITIATION PROTOCOL (SIP)

(75) Inventors: Xuewen Li, Cary, NC (US); Xiaohong Wang, Cary, NC (US); Jujar Nagdi, Cary, NC (US)

(73) Assignee: Nortel Networks Limited, St. Laurent, Quebec (CA)

( * ) Notice: Subject to any disclaimer, the term of this patent is extended or adjusted under 35 U.S.C. 154(b) by 375 days.

(21) Appl. No.: 11/608,061

(22) Filed: Dec. 7, 2006

(65) Prior Publication Data

US 2008/0137649 A1    Jun. 12, 2008

(51) Int. Cl.
*H04L 12/66* (2006.01)

(52) U.S. Cl. .................... 370/352; 370/392; 370/522

(58) Field of Classification Search ................ 370/392, 370/340, 409, 352, 230, 235
See application file for complete search history.

(56) References Cited

U.S. PATENT DOCUMENTS

| | | | | |
|---|---|---|---|---|
| 6,977,933 | B2 * | 12/2005 | Soncodi et al. | 370/392 |
| 7,020,130 | B2 * | 3/2006 | Krause et al. | 370/352 |
| 7,069,331 | B2 * | 6/2006 | Tripathi et al. | 709/229 |
| 7,245,609 | B2 * | 7/2007 | D'Eletto | 370/352 |
| 7,248,565 | B1 * | 7/2007 | Fourie | 370/235 |
| 7,457,283 | B2 * | 11/2008 | Dalton et al. | 370/352 |
| 7,602,710 | B2 * | 10/2009 | Grippo et al. | 370/230 |
| 7,801,289 | B2 * | 9/2010 | Adamczyk et al. | 379/201.01 |
| 7,813,335 | B2 * | 10/2010 | Terpstra et al. | 370/352 |
| 2003/0133561 | A1 * | 7/2003 | Torrey et al. | 379/220.01 |
| 2003/0156583 | A1 * | 8/2003 | Prager et al. | 370/389 |
| 2004/0240381 | A1 * | 12/2004 | Clark et al. | 370/229 |
| 2005/0074026 | A1 * | 4/2005 | Soncodi et al. | 370/465 |
| 2006/0072554 | A1 * | 4/2006 | Farahmand et al. | 370/352 |
| 2006/0072555 | A1 * | 4/2006 | St. Hilaire et al. | 370/352 |
| 2006/0146792 | A1 * | 7/2006 | Ramachandran et al. | 370/352 |

OTHER PUBLICATIONS

NPL document: Trunk groups in tel/SIP URI's published May 2005 by Gurbani and Jennings. See whole document.*
Trunk groups in tel/SIP URI's published May 2005 by Gurbani-Jennings.*
J. Rosenberg, et al., "SIP: Session Initiation Protocol" Nortel Working Group Request for Comments: 3261, Jun. 2002.
V. Gurbani, et al.,, "Representing Trunk Groups In tel/sip Uniform Resource Identifiers (URIs)", IPTEL WG, Oct. 2006, pp. 1-16.
International Search Report dated Apr. 24, 2008 for Application No. PCT/US07/24111.

* cited by examiner

*Primary Examiner* — Michael J. Moore, Jr.
(74) *Attorney, Agent, or Firm* — Hunton & Williams, LLP (57) ABSTRACT

Techniques for implementing logical trunk groups with session initiation protocol (SIP) are disclosed. In one particular exemplary embodiment, the techniques may be realized as an apparatus for implementing logical trunk groups with session initiation protocol (SIP). The apparatus may comprise a first network device and a second network device that are configured to exchange SIP signaling messages. Network traffic between the first network device and the second network device may be segregated into one or more logical groups. The SIP signaling messages associated with each logical group may include a Route header that uniquely identifies the logical group between the first network device and the second network device.

18 Claims, 7 Drawing Sheets

TECHNIQUES FOR IMPLEMENTING LOGICAL TRUNK GROUPS WITH SESSION INITIATION PROTOCOL (SIP)

FIELD OF THE DISCLOSURE

The present disclosure relates generally to telecommunications and, more particularly, to techniques for implementing logical trunk groups with session initiation protocol (SIP).

BACKGROUND OF THE DISCLOSURE

Traditionally, telephone calls have been routed exclusively through the public switched telephone network (PSTN) which is based on time division multiplexing (TDM) circuit switches with TDM trunk groups interconnecting the circuit switches. In recent years, however, Internet telephony has become increasingly popular. Voice calls, whether dialed on a landline telephone or mobile device or placed from a computer, can now be routed at least in part over the Internet, which is primarily a packet-switching network, based on one or more voice over Internet Protocol (VoIP) protocols.

Session Initiation Protocol (SIP) is a prevalent VoIP protocol developed by the Internet Engineering Task Force (IETF). SIP is an application-layer signaling protocol for creating, modifying, and terminating peer-to-peer sessions with one or more participants. These sessions are not limited to voice calls but may also include multimedia distribution and multimedia conferences.

Since the PSTN still exists and is expected to continue carrying a significant portion of voice calls, it is necessary to provide seamless interoperability between SIP and the PSTN, such that voice calls can be routed fluently between the PSTN and the Internet. For example, in the PSTN, voice calls are typically routed and processed according to their respective TDM trunk groups, which provide contextual information (or service profile) for each call. When a voice call is routed between the PSTN and the Internet, it may be desirable to preserve relevant context information associated with that voice call.

Figure 1:
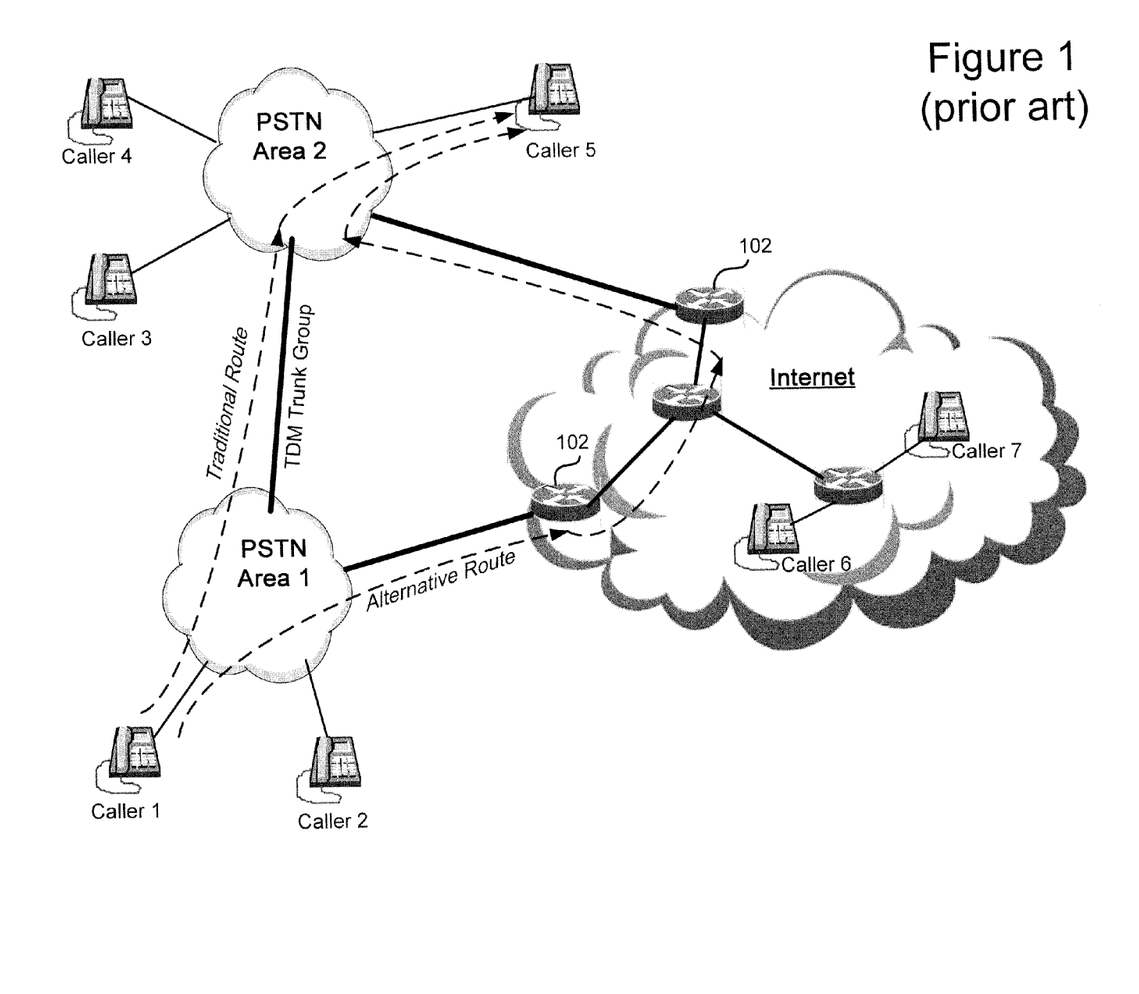
FIG. 1 illustrates current co-existence of the PSTN and the Internet and alternative call routing methods.

FIG. 1 illustrates current co-existence of the PSTN and the Internet and alternative call routing methods. The PSTN may be divided into different areas (e.g., PSTN Area 1 and PSTN Area 2) each with multiple callers connected thereto. Traditionally, a telephone call from Caller 1 to Caller 5 may be routed from PSTN Area 1 to PSTN Area 2 via a TDM trunk group. Nowadays, the call from Caller 1 to Caller 5 may more likely be routed through one or more SIP switches 102 (or switches based on other VoIP protocols such as H.323) over the Internet, and then back to the PSTN (e.g., PSTN Area 2), before the call eventually reaches Caller 5. The detour via the alternative route requires that the relevant VoIP protocol (e.g., SIP) to seamlessly interoperate with the PSTN in order to properly process and/or route the telephone call.

However, existing approaches for SIP-PSTN interoperability have achieved only limited success. According to one approach, a proprietary SIP header can be included in SIP signaling messages to communicate trunk group information between a pair of SIP nodes. Unfortunately, such a proprietary header is unlikely to see widespread use or acceptance. Another approach has been discussed in an IETF Internet draft entitled "Representing trunk groups in tel/sip Uniform Resource Identifiers (URIs)." According to this approach, trunk group parameters may be structured and represented as a standard extension to the tel URI. There are a few shortcomings with this approach. For example, this approach focuses only on edge switches that are connected with ingress or egress TDM trunk groups, and it does not address communications between a pair of internal SIP nodes. The mechanism of using tel URIs to carry TDM trunk group parameters does not facilitate any traffic segregation between two internal SIP nodes. For traffic segregation, it has been proposed that multiple pairs of Internet Protocol (IP) addresses can be assigned to two SIP nodes, one pair for each sub-channel between the two SIP nodes. This approach will significantly increase the number of IP addresses required for each SIP node, which is impracticable and undesirable.

In view of the foregoing, it would be desirable to provide a solution for SIP-PSTN interoperability which overcomes the above-described inadequacies and shortcomings.

SUMMARY OF THE DISCLOSURE

Techniques for implementing logical trunk groups with session initiation protocol (SIP) are disclosed. In one particular exemplary embodiment, the techniques may be realized as an apparatus for implementing logical trunk groups with session initiation protocol (SIP). The apparatus may comprise a first network device and a second network device that are configured to exchange SIP signaling messages. Network traffic between the first network device and the second network device may be segregated into one or more logical groups. The SIP signaling messages associated with each logical group may include a Route header that uniquely identifies the logical group between the first network device and the second network device.

In accordance with other aspects of this particular exemplary embodiment, the first network device may be further configured to: receive voice calls, segregate the voice calls into the one or more logical groups, and route the segregated voice calls to the second network device according to their respective logical groups. The second network device may be further configured to process and route the voice calls based on their respective logical groups. The voice calls may be segregated based on one or more parameters selected from a group consisting of: call type, call origin, call destination, carrier identity, caller group, and time division multiplexing (TDM) trunk parameters.

In accordance with further aspects of this particular exemplary embodiment, the first network device may be further configured to: receive the network traffic, segregate the network traffic into the one or more logical groups based on media types, and route the segregated network traffic to the second network device according to their respective logical groups.

In accordance with additional aspects of this particular exemplary embodiment, a SIP universal resource identifier (URI) in the Route header may comprise a unique identifier for the logical group.

In another particular exemplary embodiment, the techniques may be realized as a method for implementing logical trunk groups with session initiation protocol (SIP). The method may comprise configuring a first network device to exchange SIP signaling messages with a second network device. The method may also comprise segregating network traffic between the first network device and the second network device into one or more logical groups. The method may further comprise including, in the SIP signaling messages associated with each logical group, a Route header that uniquely identifies the logical group between the first network device and the second network device.

In accordance with other aspects of this particular exemplary embodiment, the method may further comprise configuring the first network device to: receive voice calls, segregate the voice calls into the one or more logical groups, and route the segregated voice calls to the second network device according to their respective logical groups. The method may further comprise configuring the second network device to process and route the voice calls based on their respective logical groups. The voice calls may be segregated based on one or more parameters selected from a group consisting of: call type, call origin, call destination, carrier identity, caller group, and time division multiplexing (TDM) trunk parameters.

In accordance with further aspects of this particular exemplary embodiment, the method may further comprise configuring the first network device to: receive the network traffic, segregate the network traffic into the one or more logical groups based on media types, and route the segregated network traffic to the second network device according to their respective logical groups.

In accordance with additional aspects of this particular exemplary embodiment, a SIP universal resource identifier (URI) in the Route header may comprise a unique identifier for the logical group.

In yet another particular exemplary embodiment, the techniques may be realized as at least one signal embodied in at least one carrier wave for transmitting a computer program of instructions configured to be readable by at least one processor for instructing the at least one processor to execute a computer process for performing the method as recited above.

In still another particular exemplary embodiment, the techniques may be realized as at least one processor readable carrier for storing a computer program of instructions configured to be readable by at least one processor for instructing the at least one processor to execute a computer process for performing the method as recited above.

In a further particular exemplary embodiment, the techniques may be realized as an apparatus for implementing logical trunk groups with session initiation protocol (SIP). The apparatus may comprise a communication module. The apparatus may also comprise a processor that is configured to exchange signaling messages, via the communication module, with at least one network device based on SIP. Network traffic between the processor and the at least one network device may be segregated into one or more logical groups. SIP messages associated with each logical group may include a Route header that uniquely identifies the logical group between the processor and the at least one network device.

The present disclosure will now be described in more detail with reference to exemplary embodiments thereof as shown in the accompanying drawings. While the present disclosure is described below with reference to exemplary embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Embodiments of the present disclosure provide SIP-PSTN interoperability techniques that enable SIP nodes (or switches) to use an existing SIP header field to efficiently communicate context information (or service profile) associated with SIP messages and/or network traffic. A "SIP logical trunk group" (SLTG) concept is introduced to facilitate routing of signaling messages in sub-channels between two SIP nodes. The SLTG concept may not only improve the routing and processing of voice calls but can also be useful in other network applications.

Figure 2:
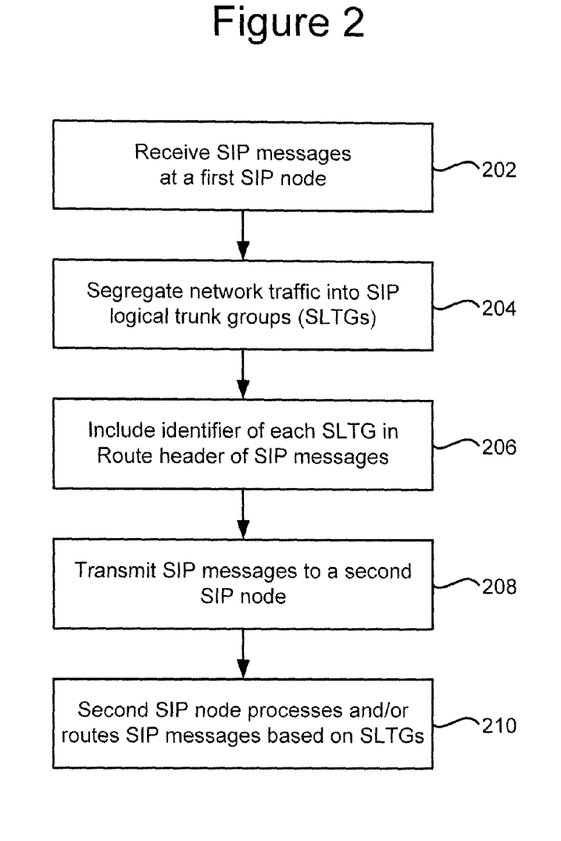
FIG. 2 shows a flow chart illustrating an exemplary method for implementing SIP logical trunk groups in accordance with an embodiment of the present disclosure.

Referring to FIG. 2, there is shown a flow chart illustrating an exemplary method for implementing SIP logical trunk groups in accordance with an embodiment of the present disclosure.

In step 202, SIP signaling messages may be received at a first SIP node. A SIP node may be any type of network device (e.g., router or switch, whether hardware—or software-based) that is configured to communicate with one or more other network devices based on session initiation protocol (SIP). It should be noted that SIP may be just one of many communication protocols supported by the SIP node. The SIP node typically may comprise a communication module that can exchange SIP signaling messages with other SIP nodes and a processor that is programmed to process and/or route network traffic based on the SIP signaling messages. A SIP node may be typically identified with an IP address. The first SIP node may be either an edge node or an internal node of a packet-switched network. For example, the first SIP node may be a soft switch coupled to an ingress TDM trunk group. The network traffic associated with the SIP messages may comprise various types of media such as, for example, voice calls, video streams, and other media or application data.

In step 204, the first SIP node may segregate the network traffic into SIP logical trunk groups (SLTGs). For example, the network traffic may be grouped according to media types, origins, or destinations. Voice calls may be grouped according to one or more criteria such as, for example, call type, call origin, call destination, carrier identity, caller group, and TDM trunk parameters. It should be noted that the logical grouping of the network traffic does not necessarily require physical segregation of data streams associated with the network traffic.

In step 206, an identifier for each SLTG may be included in a Route header of SIP messages associated with that SLTG. In current SIP protocol, a Route header field is used to force routing of a request through a set of proxies listed in the Route header field. That is, the Route header may cause a request to visit a specified set of hops on its way towards a final destination. According to embodiments of the present disclosure, identifiers for SLTGs may be conveniently included in the corresponding SIP message Route headers in order to uniquely identify the SLTGs for relevant SIP nodes. For example, a typical Route header (without any SLTG identifier) may look like the following:

Route: <sip:IP_address:UDP_port#;URI-parameters>
wherein "IP_address" refers to the IP address of an intermediate SIP node through which the message is to be routed, and "UDP-port#" refers to a designated User Datagram Protocol (UDP) port number on the intermediate SIP node. To include an SLTG identifier (e.g., "SLTG-ID") in the Route header, a user information field containing the "SLTG-ID" string may be inserted before the "IP_address." Then, the Route header may look like the following:

Route: <sip: SLTG-ID@IP_address:UDP_port#;URI-parameters>

In step 208, the SIP messages may be transmitted to a second SIP node. Similar to the first SIP node, the second SIP node may be either an edge node or an internal node of a packet-switched network. For example, the second SIP node may be a soft switch coupled to an egress TDM trunk group. The second SIP node may have a configuration option that indicates whether multiple SLTGs or sub-channels are supported between the first and second SIP nodes. If multiple SLTGs are supported, the second SIP node may examine the user information field in the Route header of each SIP message it receives. For example, upon receiving a SIP message with the following Route header:

Route: <sip: SLTG-ID@IP_address:UDP_port#;URI-parameters>, the second SIP node may become informed that the network traffic associated with this particular SIP message belong to a SLTG named "SLTG-ID."

Then, in step 210, the second SIP node may route and/or process the SIP messages (and/or the network traffic) based on the SLTGs.

Figure 3:
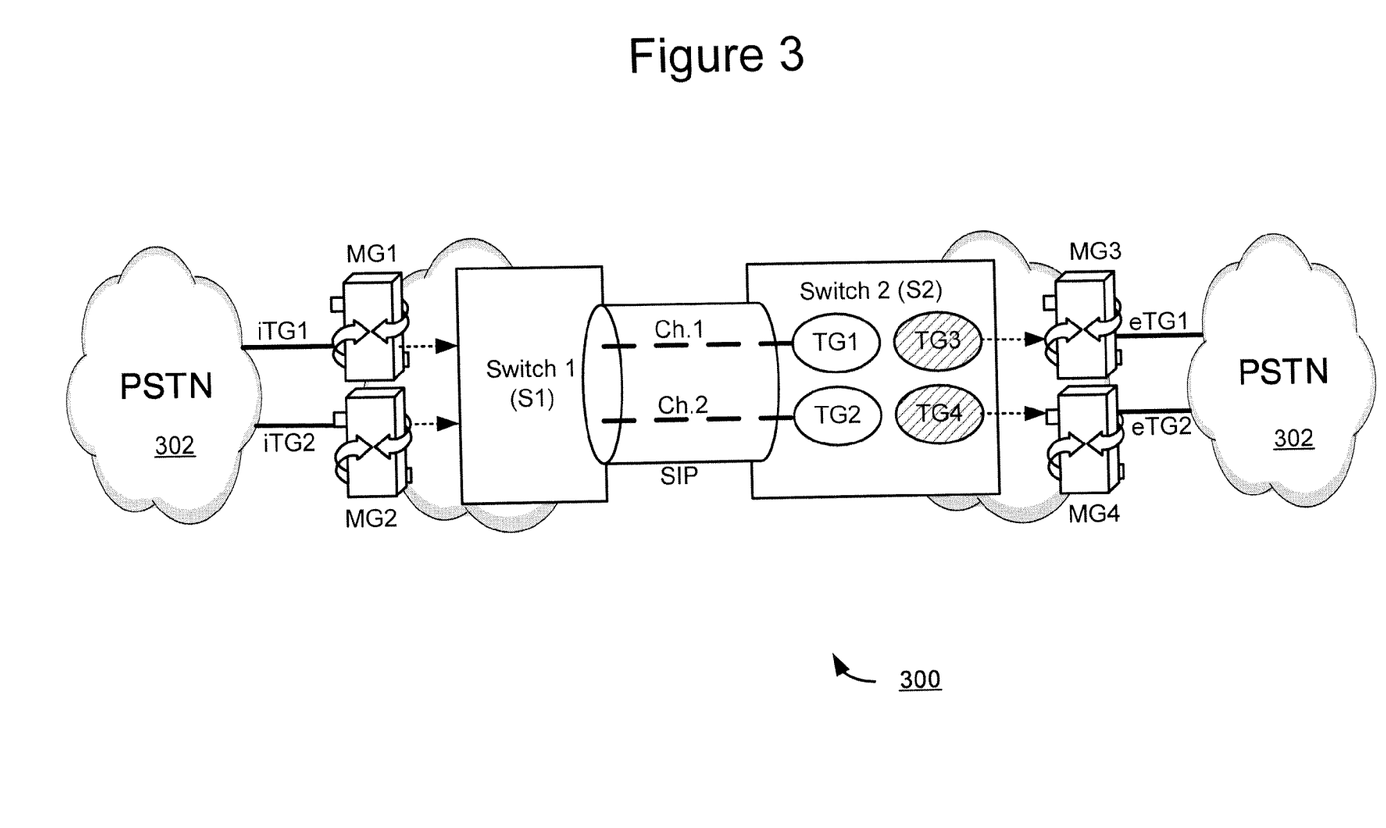
FIG. 3 shows a block diagram illustrating an exemplary system for implementing SIP logical trunk groups in accordance with an embodiment of the present disclosure.

FIG. 3 shows a block diagram illustrating an exemplary system 300 for implementing SIP logical trunk groups in accordance with an embodiment of the present disclosure. The system 300 may comprise two SIP switches, Switch 1 (S1) and Switch 2 (S2), in a packet-switched network. S1 and S2 may have their respective IP addresses and may communicate with each other via a SIP signaling link that is divided into two sub-channels: Ch.1 and Ch.2.

A PSTN 302 may be coupled to two media gateways, MG1 and MG2, via two ingress TDM trunk groups, iTG1 and iTG2, respectively. The media gateways MG1 and MG2 may function as translation units between the PSTN 302 and the packet-switched network. The media gateways MG1 and MG2 may be controlled by or otherwise coupled to S1. S2 may be coupled to the PSTN 302 via media gateways, MG3 and MG4, and egress TDM trunk groups, eTG1 and eTG2.

Network traffic (e.g., voice calls) from the PSTN 302 and associated SIP messages may reach S1 via either the iTG1-MG1 route or the iTG2-MG2 route. S1 may assign the incoming voice calls to two SLTGs, TG1 and TG2, based on their incoming TDM trunk groups. For example, those voice calls that come from the PSTN 302 via the TDM trunk group iTG1 may be assigned to TG1, and those voice calls that come from the PSTN 302 via the TDM trunk group iTG2 may be assigned to TG2. Therefore, the TDM trunk group information may be preserved for the voice calls as they are routed through the packet-switched network. Then, SIP messages for voice calls assigned to the TG1 and TG2 logical groups may be transmitted to S2 via the two sub-channels Ch.1 and Ch.2 respectively. That is, S1 may include corresponding SLTG identifiers in the Route headers of the SIP messages to indicate which of the two logical trunk groups TG1 and TG2 each SIP message is associated with.

As S2 receives the SIP messages from S1, S2 may determine the logical grouping of the SIP messages based on the SLTG identifiers in the Router headers. Similar to TDM trunk groups, each SLTG may be associated with a service profile based on which S2 may route and process the corresponding voice calls. For example, based on the service profiles, S2 may regroup the voice calls into logical groups TG3 and TG4 and may route them to the PSTN 302 via either the MG3-eTG1 route or the MG4-eTG2 route.

Figure 4:
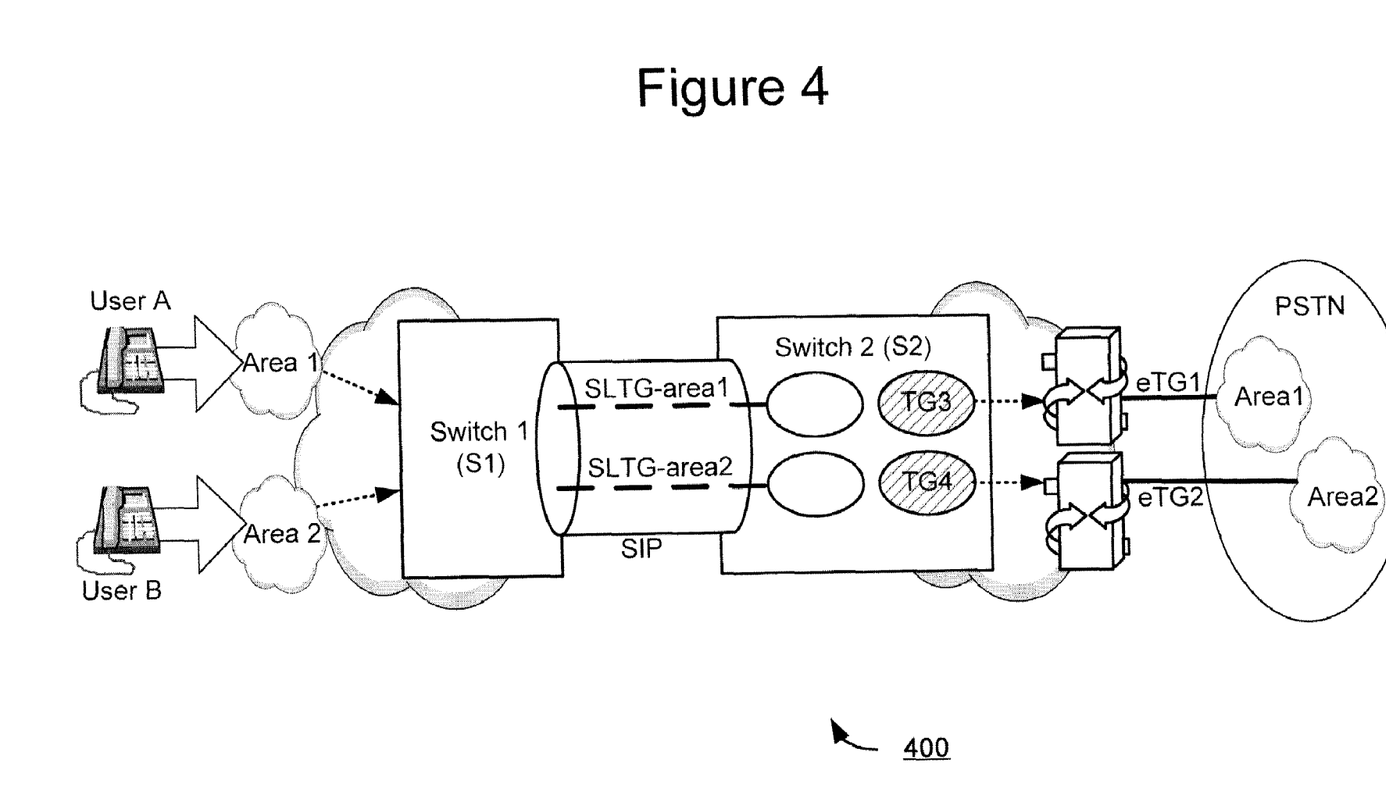
FIG. 4 shows a block diagram illustrating another exemplary system for implementing SIP logical trunk groups in accordance with an embodiment of the present disclosure.

FIG. 4 shows a block diagram illustrating another exemplary system 400 for implementing SIP logical trunk groups in accordance with an embodiment of the present disclosure. The system 400 may comprise two SIP switches, Switch 1 (S1) and Switch 2 (S2), in a packet-switched network. S1 and S2 may communicate with each other by exchanging SIP messages.

S1 may serve multiple geographical regions, e.g., Area 1 and Area 2. That is, S1 may receive voice calls that originate from both Area 1 and Area 2. If the voice calls are routed from S1 to S2 without proper grouping, at least some voice calls may cause confusion and routing errors at S2. For example, if User A dials "0" for operator in Area 1 and User B dials "0" for operator in Area 2, then, without the corresponding geographical context, S2 may not properly distinguish the two operator calls.

To solve this problem, S1 may group all calls from Area 1 into one SLTG named "SLTG-area1," and all calls from Area 2 may be grouped into another SLTG named "SLTG-area2." SIP messages associated with these two logical groups may be uniquely identified for S2 with the above-described SIP message Route headers. For example, a Route header for a SIP message associated with the "SLTG-area1" group may be:

Route: <sip:SLTG-area1@47.142.97.120:5060;lr>
wherein "47.142.97.120" is the IP address of S2, "5060" is a UDP port number for SIP messages on S2, and "lr" is a URI parameter. This Route header signals to S2 that this particular SIP message is associated with a voice call destined for Area 1. Therefore, any operator call in the "SLTG-area1" group should be routed to the operator in Area 1.

As S2 receives the SIP messages from S1, S2 may further route the voice calls based on their SLTGs as indicated in the corresponding SIP messages. For example, voice calls in the "SLTG-area1" group may be routed via a first egress TDM trunk group eTG1 to Area 1, and voice calls in the "SLTG-area2" group may be routed via a second egress TDM trunk group eTG2 to Area 2.

Figure 5:
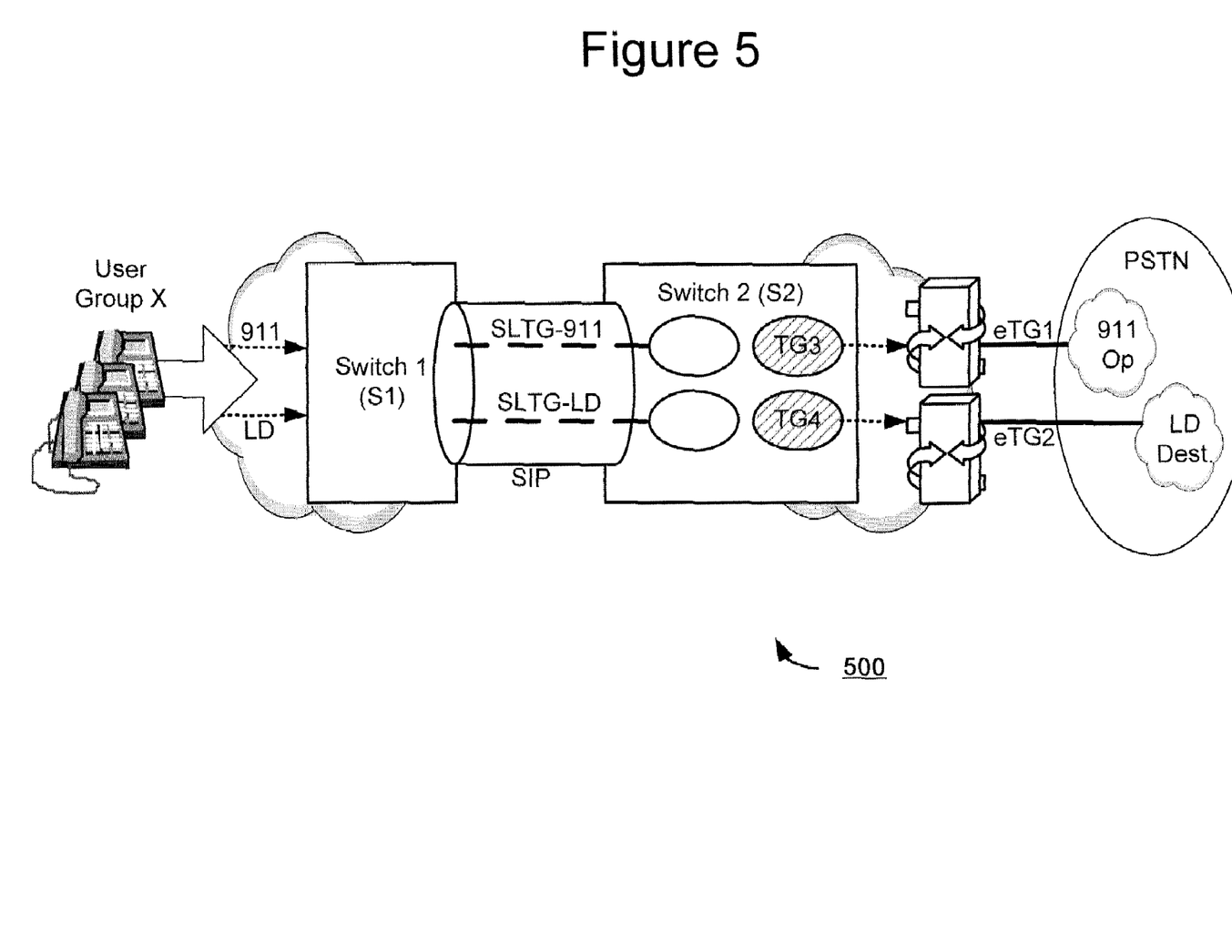
FIG. 5 shows a block diagram illustrating yet another exemplary system for implementing SIP logical trunk groups in accordance with an embodiment of the present disclosure.

Apart from call origins or destinations, voice calls can also be grouped based on call types. FIG. 5 shows a block diagram illustrating yet another exemplary system 500 for implementing SIP logical trunk groups in accordance with an embodiment of the present disclosure. The system 400 may comprise two SIP switches, Switch 1 (S1) and Switch 2 (S2), in a packet-switched network. S1 may serve a User Group X (i.e., subscribers) and S2 may be a PSTN gateway switch. S1 and S2 may communicate with each other by exchanging SIP messages.

In this example, a User Group X may initiate different types of calls, such as 911 emergency calls or long distance calls. S1 may receive different types of voice calls from the User Group X and may group the voice calls according to call types. For example, all 911 emergency calls may be assigned to a SLTG named "SLTG-911," and all long distance calls may be assigned to another SLTG named "SLTG-LD." S1 may use SIP message Route headers to identify the two logical groups to S2. S2 may then route the two types of voice calls to their proper destinations, i.e., SLTG-911 calls to a local emergency operator and SLTG-LD calls to their long-distance destinations.

Figure 6:
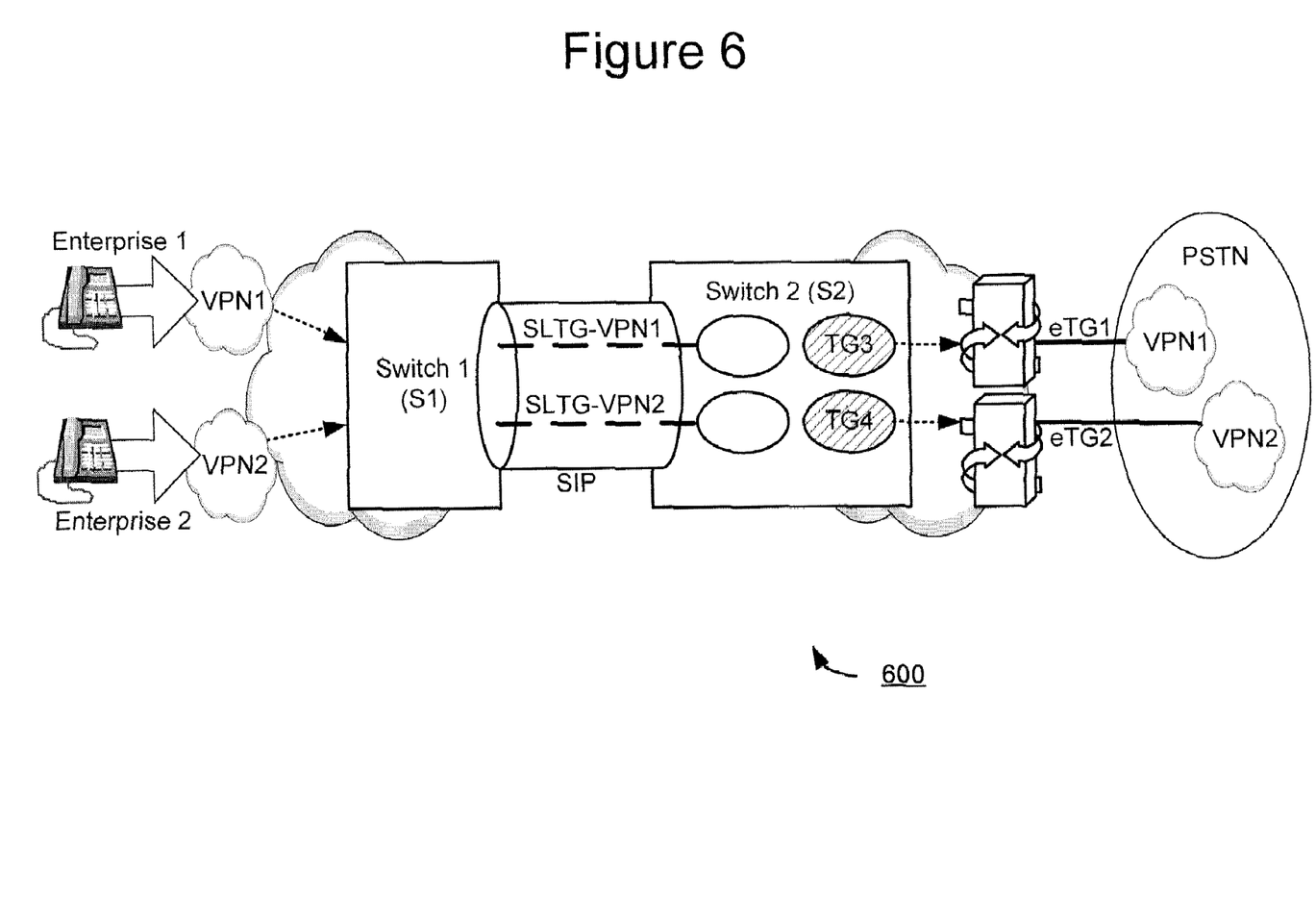
FIG. 6 shows a block diagram illustrating still another exemplary system for implementing SIP logical trunk groups in accordance with an embodiment of the present disclosure.

FIG. 6 shows a block diagram illustrating still another exemplary system 600 for implementing SIP logical trunk groups in accordance with an embodiment of the present disclosure. In this example, Switch 1 (S1) may serve multiple virtual private networks (VPNs) (e.g., VPN1 and VPN2) for different enterprises (e.g., Enterprise 1 and Enterprise 2). Internal telephone calls within each enterprise may be initiated with abbreviated dialing, for example, by dialing extension numbers only. To properly distinguish the internal calls for the different or enterprises, S1 may group the voice calls (or other communications) according to their originating VPNs. For example, voice calls from Enterprise 1 (VPN1) may be assigned to an SLTG named "SLTG-VPN1," and voice calls from Enterprise 2 (VPN2) may be assigned to another SLTG named "SLTG-VPN2." The different logical groups may be signaled to Switch 2 (S2) through the above-described SLTG signaling mechanism using Route headers. S2 may then route and/or process the VPN traffic according to the SLTGs.

Figure 7:
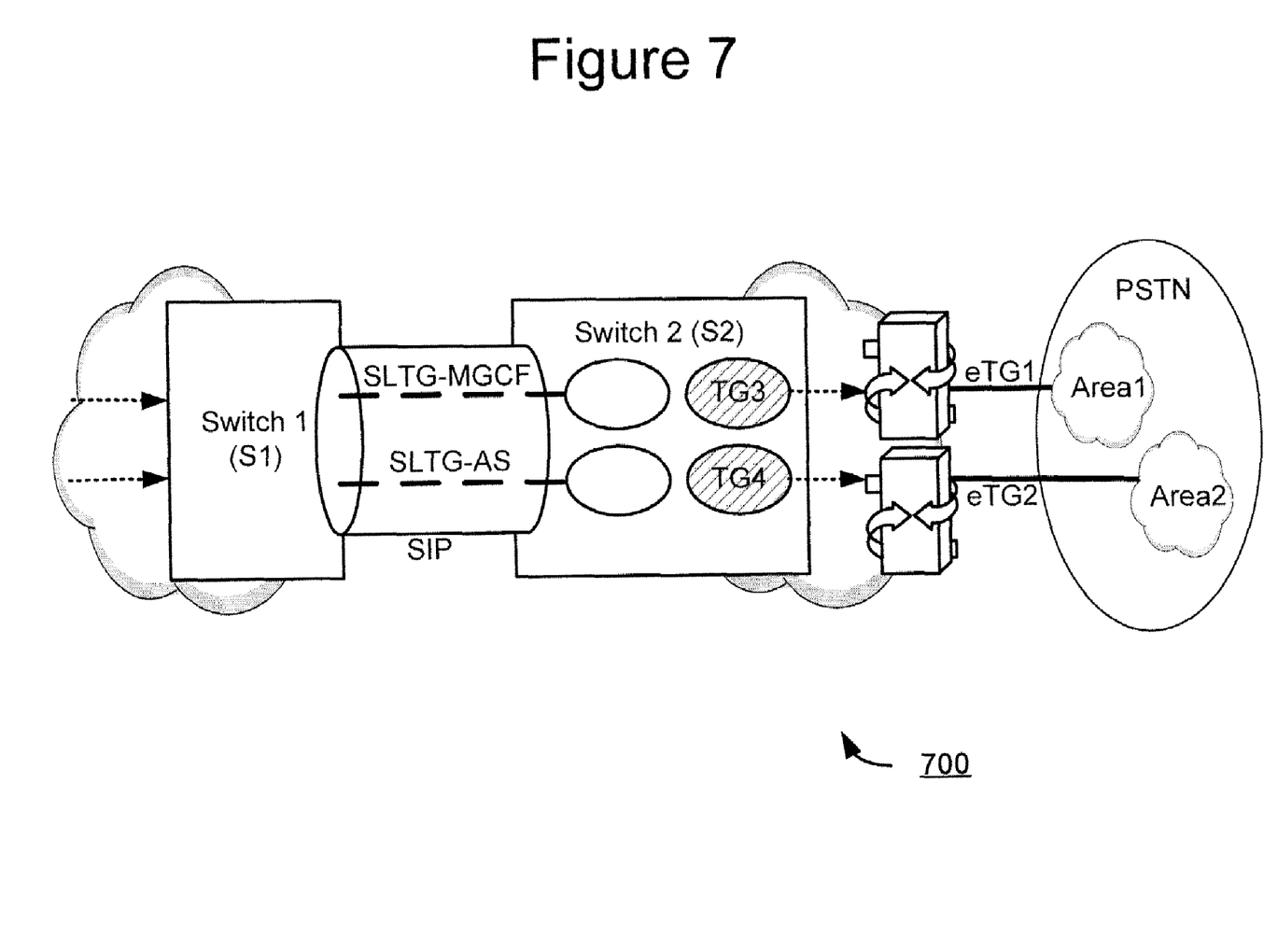
FIG. 7 shows a block diagram illustrating an exemplary system for implementing SIP logical trunk groups in accordance with an embodiment of the present disclosure.

FIG. 7 shows a block diagram illustrating an exemplary system 700 for implementing SIP logical trunk groups in accordance with an embodiment of the present disclosure. In this example, Switch 2 (S2) may be a service entry point supporting multiple functions. S2 may serve as either a media gateway control function (MGCF) or an application server (AS) for different users. A preceding node, Switch 1 (S1), may group incoming network traffic for S2 based on which S2 function they are associated with. For example, media data associated with the MGCF may be grouped into an SLTG named "SLTG-MGCF," and application data associated with the application server functions may be grouped into another SLTG named "SLTG-AS." By examining Route headers of incoming SIP messages from S1, S2 may be informed as to which service to perform.

At this point it should be noted that the technique for implementing logical trunk groups with session initiation protocol (SIP) in accordance with the present disclosure as described above typically involves the processing of input data and the generation of output data to some extent. This input data processing and output data generation may be implemented in hardware or software. For example, specific electronic components may be employed in a computer and/or communications network or similar or related circuitry for implementing the functions associated with SIP logical trunk groups in accordance with the present disclosure as described above. Alternatively, one or more processors operating in accordance with stored instructions may implement the functions associated with SIP logical trunk groups in accordance with the present disclosure as described above. If such is the case, it is within the scope of the present disclosure that such instructions may be stored on one or more processor readable carriers (e.g., a magnetic disk), or transmitted to one or more processors via one or more signals.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. An apparatus for implementing logical trunk groups with session initiation protocol (SIP), the apparatus comprising:
a first internal SIP-enabled network node and a second internal SIP-enabled network node that are configured to exchange SIP signaling messages, wherein the first internal SIP-enabled network node is coupled to at least one ingress trunk group and the second internal SIP-enabled network node is coupled to at least one egress trunk group;
wherein network traffic between the first internal SIP-enabled network node and the second internal SIP-enabled network node is segregated into one or more SIP logical groups;
wherein the SIP signaling messages associated with each logical group include a Route header that uniquely identifies the logical group between the first internal SIP-enabled network node and the second internal SIP-enabled network node; and
wherein the Route header comprises a unique identifier for the logical group disposed adjacent to an IP address associated with an intermediate SIP-enabled network node through which the messages are to be routed.

2. The apparatus according to claim 1, wherein the first internal SIP-enabled network node is further configured to:
receive voice calls;
segregate the voice calls into the one or more SIP logical groups; and
route the segregated voice calls to the second internal SIP-enabled network node according to their respective logical groups.

3. The apparatus according to claim 2, wherein the second internal SIP-enabled network node is further configured to process and route the voice calls based on their respective logical groups.

4. The apparatus according to claim 2, wherein the voice calls are segregated based on one or more parameters selected from a group consisting of: call type, call origin, call destination, carrier identity, caller group, and time division multiplexing (TDM) trunk parameters.

5. The apparatus according to claim 1, wherein the first internal SIP-enabled network node is further configured to:
receive the network traffic;
segregate the network traffic into the one or more SIP logical groups based on media types; and
route the segregated network traffic to the second internal SIP-enabled network node according to their respective logical groups.

6. The apparatus according to claim 1, wherein a SIP universal resource identifier (URI) in the Route header comprises a unique identifier for the logical group.

7. A method for implementing logical trunk groups with session initiation protocol (SIP), the method comprising:
configuring a first internal SIP-enabled network node to exchange SIP signaling messages with a second internal SIP-enabled network node, wherein the first internal SIP-enabled network node is coupled to at least one ingress trunk group and the second internal SIP-enabled network node is coupled to at least one egress trunk group;

segregating, via at least one computer processor, network traffic between the first internal SIP-enabled network node and the second internal SIP-enabled network node into one or more SIP logical groups; and including, in the SIP signaling messages associated with each logical group, a Route header that uniquely identifies the logical group between the first internal SIP-enabled network node and the second internal SIP-enabled network node, wherein the Route header comprises a unique identifier for the logical group disposed adjacent to an IP address associated with an intermediate SIP-enabled network node through which the messages are to be routed.

8. The method according to claim 7, further comprising configuring the first internal SIP-enabled network node to:
receive voice calls;
segregate the voice calls into the one or more SIP logical groups; and
route the segregated voice calls to the second internal SIP-enabled network node according to their respective logical groups.

9. The method according to claim 8, further comprising configuring the second internal SIP-enabled network node to process and route the voice calls based on their respective logical groups.

10. The method according to claim 8, wherein the voice calls are segregated based on one or more parameters selected from a group consisting of: call type, call origin, call destination, carrier identity, caller group, and time division multiplexing (TDM) trunk parameters.

11. The method according to claim 7, further comprising configuring the first internal SIP-enabled network node to:
receive the network traffic;
segregate the network traffic into the one or more SIP logical groups based on media types; and
route the segregated network traffic to the second internal SIP-enabled network node according to their respective logical groups.

12. The method according to claim 7, wherein a SIP universal resource identifier (URI) in the Route header comprises a unique identifier for the logical group.

13. At least one non-transitory processor readable storage medium storing a computer program of instructions configured to be readable by at least one processor for instructing the at least one processor to execute a computer process for performing the method as recited in claim 7.

14. An apparatus for implementing logical trunk groups with session initiation protocol (SIP), the apparatus comprising:
a communication module;
a processor that is configured to exchange signaling messages, via the communication module, with at least one internal SIP-enabled network node based on SIP, wherein the at least one internal SIP-enabled network node is coupled to at least one ingress trunk group;
wherein network traffic between the processor and the at least one internal SIP-enabled network node are segregated into one or more SIP logical groups;
wherein SIP messages associated with each logical group include a Route header that uniquely identifies the logical group between the processor and the at least one internal SIP-enabled network node; and
wherein the Route header comprises a unique identifier for the logical group disposed adjacent to an IP address associated with an intermediate SIP-enabled network node through which the messages are to be routed.

15. The apparatus according to claim 14, wherein the processor is further configured to:
receive voice calls;
segregate the voice calls into the one or more SIP logical groups; and
route the segregated voice calls to the at least one internal SIP-enabled network node according to their respective logical groups.

16. The apparatus according to claim 15, wherein the voice calls are segregated based on one or more parameters selected from a group consisting of: call type, call origin, call destination, carrier identity, caller group, and time division multiplexing (TDM) trunk parameters.

17. The apparatus according to claim 14, wherein the processor is further configured to:
receive the network traffic;
segregate the network traffic into the one or more SIP logical groups based on media types; and
route the segregated network traffic to the at least one internal SIP-enabled network node according to their respective logical groups.

18. The apparatus according to claim 14, wherein a SIP universal resource identifier (URI) in the Route header comprises a unique identifier for the logical group.

* * * * *